Patented May 30, 1950

2,509,719

UNITED STATES PATENT OFFICE 2,509,719

TREATMENT OF VEGETABLE MATTER PREPARATORY TO DEHYDRATION

Clarence Birdseye, Gloucester, Mass., assignor to Dehydration, Inc., Gloucester, Mass., a corporation of Massachusetts No Drawing. Application May 19, 1944,
Serial No. 536,422

2 Claims. (Cl. 99—204)

This invention has for its primary objective the production of dehydrated vegetables having a brighter and more attractive appearance, a less brittle consistency when dry, longer storage life, superior cooking qualities, and more pleasing appearance as well as greater nutritive values when actually served than characterize dehydrated products now commercially available.

More specific objects of the invention are to intensify and fix the chlorophyl, carotene, and other natural pigments of the plant tissue so that they remain bright during the blanching, dehydrating, storing, and cooking operations; to minimize oxidative changes during storage; to control the pH of the products during various stages of processing, storing, and cooking so that certain colors and nutritional values of the fresh vegetable will be more fully present when the dried product has been rehydrated, cooked, and served on the table; and to add to the vegetables, either before, during, or after dehydration, certain desirable factors not in large degree characteristic of the fresh products from which the dehydrated vegetables are prepared.

Fruits have for many years been treated with sulphur, usually in the form of gas, to retard or prevent discoloration and oxidation during drying and subsequent storage. Vegetables, according to recent U. S. A. Quartermaster Corps specifications, are dipped in or showered with a solution of sodium sulphite in order to lessen oxidation during dehydration and storage and thus better to preserve the vitamin C content of the product. Green vegetables, too, are often boiled in water which has been made strongly alkaline by the addition of substantial quantities of sodium bicarbonate for the purpose of intensifying the green color of the chlorophyl and preventing it from breaking down during the cooking process into the less attractively colored phaeophytin.

All of the presently-known processes mentioned above have serious drawbacks and shortcomings. Treating fruits with sulphur gas is a relatively long and expensive process. Immersing unblanched vegetables in a cold aqueous solution of sodium sulphite is unsatisfactory because the solution does not penetrate or become absorbed by the living tissues and consequently does not become uniformly distributed through the tissues when they are subsequently blanched. This causes a greater loss of vitamin C and more fading of the chlorophyl in some pieces of the product than in others. It is equally unsatisfactory to treat the vegetables after blanching because the blanched tissues lose to the sulphite solution too great a proportion of their original vitamin and mineral contents and, in addition, contaminate the solution with minute tissue fragments, expressed juices, and other undesirable matter. Again, it is undesirable to treat the vegetables, either before or after blanching, with a hot solution of sodium sulphite or other substances which are quickly volatilized at elevated temperatures, since such volatilization makes it extremely difficult to maintain the solution at the desired concentration during prolonged large-scale operations. The above-mentioned common practice of adding sodium bicarbonate to the water in which vegetables are boiled is universally condemned by nutritionists because vitamin C (ascorbic acid) is lost very rapidly in alkaline cooking water.

However, by the process of my present invention it is possible to avoid the above-mentioned disadvantages and shortcomings and to bring about, prior to dehydration, many changes in the physical and chemical nature of the product which aid in producing dehydrated vegetables of a quality greatly superior to any which are now commercially available. Through much experimentation I have learned that a principal reason why cool solutions of sodium sulphite and other materials applied at low temperatures to living plant tissues prior to blanching do not adhere to those tissues in an even, uninterrupted film and therefore cannot penetrate them evenly when they are subsequently blanched, is that the epidermal portions of living edible plant tissues are covered with a protective coating, the supposed purpose of which is to slow down evaporation of moisture. In many instances this protective coating is of a waxy or oily nature on which, because of surface tension, an aqueous film does not remain evenly distributed. Moreover, the nature and effectiveness of this coating varies on different parts of the same plant being, for instance, much heavier on the "heads" than on the leaves and stems of broccoli. Still further, even the cut surfaces of the interior tissues of such root vegetables as sliced carrots do not permit the penetration of the solutes in treating solutions except by the slow process of osmosis.

My experiments have, however, indicated that if living vegetable tissues destined for dehydration are immersed briefly in very hot water, several highly desirable results are obtained. First, the brief application of hot water melts and removes from the uncut surface tissues their waxy or oily protective coating and thereby so conditions those surface tissues that when they are subsequently dipped in a cold aqueous solution of sodium sulphite and/or other solutes, the solution does adhere in a substantially equal film over the entire surface of the product and is therefore evenly absorbed by the surfaces when the tissues are subsequently killed during the blanching process. Second, the brief treatment with hot water kills and disrupts the epidermal cells as well as the surface cells of cut interior portions, so that the cold aqueous solution is immediately brought into direct contact with the still living interior cells and "bonded" there by the broken fragments of the surface cells. Third, the application of the very hot water to the prepared plant tissue mechanically cleans it of minute fragments which would otherwise be washed off into and contaminate the aqueous solution. Fourth, the brief application of hot water to the plant tissues effectively intensifies and sets the chlorophyl, carotene, and other pigment and thus aids in preserving its attractive color during subsequent treatments. Fifth, the very brief hot-water dip washes the pieces without dissolving substantial quantities of nutrients from them.

Although I prefer to use hot water to kill the surface tissues as above set forth, I may use steam or heat in any other form. In the case of certain vegetables and fruits having integuments which are exceptionally resistant to the preliminary hot-water treatment (e. g. peppers and prunes), I substitute a very brief bath in boiling lye, which will check or crack even the toughest plant integument and so render it pervious to the solution containing the several additions hereinafter mentioned. I wish it understood that the brief heat treatment described in this paragraph does not constitute a "blanch" for the purpose of inactivating enzymes, and must be followed by a further heat treatment, or cooking operation, during which the plant tissues are killed, enzymes inactivated, and the solutes of the solution, mentioned in the following paragraph, are allowed to penetrate into and react upon the said tissues before they are placed in the dehydrating apparatus.

In another aspect, my invention consists in applying to the unblanched vegetable, preferably after it has been first subjected as outlined above to a brief treatment with very hot water, a cool solution containing one or more edible alkaline materials, such as sodium sulphite, sodium bicarbonate, calcium hydroxide, magnesium hydroxide, acetic or other edible acids, and glycerine or other edible material which, when dried as a coating upon, or an ingredient of the product, serves as a plasticizer rendering the dried vegetable less brittle. The functions of these several ingredients of the cold aqueous solution are described in greater detail hereinbelow. Calcium, iron, and sodium fluoride are among the minerals which I may add to my product.

In still another aspect, the present invention consists in the addition to the product, during or after the dehydration process, of vitamins, wetting and dispersing agents, antioxidants, iodine, various minerals, and other edible substances, the presence of which in the finished vegetable will render it more valuable from the point of view of appearance, keeping quality, nutritive value, taste, aroma, or otherwise.

Still another phase of my invention deals with the manner in which the comestibles are cut, slit, or sliced before being subjected to the hot water treatment hereinbefore mentioned.

It is highly desirable that vegetable tissues maintain their acid character throughout the blanching, dehydrating, storing, and cooking operations so that they are still more or less acid when ready for the table. This retention of acidity is, in fact, extremely important; for if at any time the vegetable tissue becomes alkaline, there is a rapid loss of vitamin C (ascorbic acid). By experimentation I have discovered that it is possible so to regulate the pH of the above-mentioned aqueous solutions that the desired fixation of chlorophyl may be obtained without upsetting the natural acidity of the plant tissue to such an extent that there is a serious loss of ascorbic acid during processing, storing, or cooking. This proper pH of the aqueous solution varies with a number of factors (e. g. the acidity of the tissue being treated and the degree to which the solution is made to penetrate the tissue). The essential thing is that the plant tissue must not lose its acid reaction during dehydration, subsequent storage, and even preparation for the table.

My purpose in adding glycerine to the above-mentioned aqueous solution is to render the plant tissue less brittle when dry. When glycerine is incorporated in the aqueous solution, it penetrates the individual units of the food mass during blanching and as dehydration proceeds. In this manner relatively minute, yet ample, quantities of the glycerine may be added to the product without imparting a glossy appearance or sticky feeling. The use of glycerine in this manner is particularly desirable in the case of green sweet (wrinkled) peas, the "skin" of which will otherwise become so brittle during dehydration that it may break and allow the halves (cotyledons) of the peas to fall apart, thus making the dried product less desirable for table use. Sometimes, as in the case of rutabagas, I may use as a plasticizer, instead of glycerine, a substance such as propylene glycol, which absorbs and stabilizes the volatile elements in the food which might otherwise evaporate and be lost. Sugar is another satisfactory plasticizer.

As will be readily understood, a dehydrated vegetable which is flexible at room temperatures has the great practical advantage that it can be more compactly packaged than can ordinary dehydrated vegetables, which are extremely brittle when sufficiently dry. The weight and number of servings of my plasticized vegetables which can be packaged in a given container without excessive breakage, and by the application of a given amount of pressure, is at least twice that of the ordinary dehydrated vegetables of similar moisture content.

Most ordinary dehydrated vegetables can be compressed without undue breakage into self-supporting briquettes of great density only if the compressing operation takes place at elevated temperatures (150 to 170° F. in the case of carrots) and utilizes great pressures (1000 to 2000 pounds per square inch). Vegetables compressed into briquettes at such elevated temperatures will quickly deteriorate in appearance, flavor, and nutritive value unless cooled very quickly there-after—an expensive and time-consuming operation. My flexible plasticized vegetables can be compressed into briquettes with substantially no breakage at room temperatures and at pressures considerably less than 1000 pounds per square inch. They need not be cooled after being compressed.

My purpose in adding an antioxidant to dehydrated vegetables is that such vegetables, even if thoroughly blanched to inactivate their enzyme content, deteriorate more or less rapidly during storage. This deterioration is, at least in part, due to oxidation and may be retarded by the addition to the product of an antioxidant, e. g. wheat germ oil. One feature of the present invention is the addition to the product of such an edible antioxidant during the dehydration process, preferably after at least 50 per cent of the original moisture content of the vegetable has been removed.

For the reasons above explained the sequence of steps characterizing my process, that is to say, the hot dipping, the cool solution treatment, and the blanching, are changed in dealing with products which are dried without previous blanching. Onions are such a product, for if they are heat-treated before being dehydrated, the resultant product will be of an undesirable grayish color. Yet the storage and cooking qualities of dehydrated onions are greatly improved by the addition of, for instance, sodium sulphite to retard oxidation, sodium bicarbonate to tenderize the tissues and shorten the cooking time, and glycerine to render the dried product flexible. I have determined that storage life at 80° F. is doubled and required boiling time approximately halved if the raw onions, sliced in rings $\frac{3}{32}$" thick, are first deprived of from 40 per cent to 60 per cent of their original moisture content, then immersed in or showered with a 100°–150° F. aqueous solution containing from ½% to 1% each of sodium sulphite and sodium bicarbonate by weight, and then dried to a residual moisture content of 5% or less. If a flexible dehydrated product is desired, glycerine may be added to the solution in the amount of 10% to 50% by weight.

Still another phase of my invention resides in a novel method of cutting or slicing certain types of vegetables, such as broccoli and cauliflower, so that the heads will be retained in reasonably large clusters but the stems or branches which hold those head clusters together will be opened up so that the solutes in the above-mentioned cold aqueous solution can better be applied to the interior tissues of the stems. This is accomplished by splitting both the main stem and the principal branches, which leave it to support the blossom clusters, longitudinally in such a manner that no section of the stem is allowed to remain more than approximately $\frac{3}{16}$ of an inch thick and yet to accomplish this splitting in such a manner that at least two of the terminal blossom clusters remain in one piece.

EXAMPLES OF PROCESS

*Example 1*

Prepare three typical commercial bunches of broccoli by stripping off and discarding all except the smallest leaves and thoroughly washing the remaining heads to remove insects, imperfections, dirt, and insect poisons. Sever bud-clusters from stems in such a manner that the bud-clusters are left largely intact, with about one inch of stem attached. Split that part of the stem longitudinally into sections about $\frac{3}{32}$" thick, being careful not to break up the bud clusters by so doing. Slice the balance of the stems transversely into pieces approximately $\frac{3}{32}$" thick. Mix the bud-clusters and the stem slices, and dip both very briefly (about 5 seconds) in water having a temperature of about 205° F. In this step of the process the natural oily or waxy coating of the broccoli is melted and removed leaving the epidermal layer of cells in place. Drain, and then dip for about 10 seconds in a cool (approximately 100° F.) aqueous solution containing approximately .25 per cent (by weight) of sodium sulphite, .25 per cent of sodium bicarbonate, and 25 to 50 per cent of pure edible glycerine. In this step of the process the sodium bicarbonate is effective to tenderize the tissue and shorten the subsequent cooking time, while the sodium sulphite is effective to retard oxidation of the product. Drain, and blanch for 5 minutes in live steam at atmospheric pressure. Dehydrate in any approved manner, preferably in the apparatus disclosed in my co-pending application Ser. No. 529,623. Fresh broccoli is slightly acid and is rich in vitamin A and very rich in vitamin C (ascorbic acid). The above-described treatment, while fixing intact the green color of the fresh broccoli, does not to any appreciable extent lessen the natural acidity of the broccoli, as indicated by the fact that water in which the dehydrated product is subsequently boiled will be acid. It does lessen the cooking time necessary to tenderize the broccoli for eating. This treatment retains in the dried broccoli not only substantially all of the original green color, but a very high percentage of the original vitamin C content. The glycerine taken up by the plant tissues from the aqueous solution improves the flavor of the dried broccoli, increases the rate of rehydration, and by means of its plasticizing effect renders the dried tissue sufficiently flexible to permit a certain degree of compression into packages without too much breaking of the delicate bud-clusters.

*Example 2*

Remove all damaged leaves from several cabbage heads, wash, split each head along the axis of the core, remove cores, slice into shreds $\frac{3}{32}$" thick, dip for 5 seconds in water having a temperature of 200° F. or higher, shower for 10 seconds with a cool (not more than 130° F.) aqueous solution of .25% sodium sulphite, .25% sodium bicarbonate, and 25 to 50% pure edible glycerine. These percentages are by weight. Drain, blanch in live steam for 3 minutes, and dehydrate in any approved manner to a residual moisture content of 5% or less.

Having thus disclosed my invention and described in detail several examples of its application, I claim as new and desire to secure by Letters Patent:

1. In a vegetable dehydration process, the steps of blanching units of vegetable tissue to inactivate their enzyme content, partially dehydrating the units, adding a plasticizing agent to the units, and further dehydrating the units with the plasticizer contained therein.

2. The process of dehydrating raw onions which includes the following steps: (1) first partially dehydrating pieces of onion to 40–60% of their original moisture content, (2) then subjecting the partially dehydrated pieces to a solution containing a plasticizing agent, and (3) then drying the onion pieces thus treated to a residual moisture content of not more than 5%.

CLARENCE BIRDSEYE.

REFERENCES CITED

The following references are of record in the file of this patent:

UNITED STATES PATENTS

| Number | Name | Date |
|---|---|---|
| 611,017 | Newmann | Sept. 20, 1898 |
| 1,259,631 | King | Mar. 19, 1918 |
| 1,448,512 | Benjamin | Mar. 13, 1923 |
| 1,655,690 | Dunkley | Jan. 10, 1928 |
| 1,699,456 | Taylor | Jan. 15, 1929 |
| 1,721,929 | Steinwand | July 23, 1929 |
| 1,948,877 | Draper | Feb. 27, 1934 |
| 2,054,565 | Stovall et al. | Sept. 15, 1936 |
| 2,094,314 | Wiggins | Sept. 28, 1937 |
| 2,227,246 | Chuck | Dec. 31, 1940 |
| 2,241,436 | Williams | May 13, 1941 |
| 2,259,582 | Perky | Oct. 21, 1941 |
| 2,358,750 | Rogers | Sept. 12, 1944 |
| 2,363,193 | Moore | Nov. 21, 1944 |
| 2,400,845 | Shepard | May 21, 1946 |

FOREIGN PATENTS

| Number | Country | Date |
|---|---|---|
| 111,968 | Australia | of 1940 |